(12) United States Patent
Bennett et al.

(10) Patent No.: US 9,637,184 B1
(45) Date of Patent: May 2, 2017

(54) REAR FAIRING SYSTEM FOR A VEHICLE

(71) Applicant: UTILITY TRAILER MANUFACTURING COMPANY, City of Industry, CA (US)

(72) Inventors: Jeffrey J. Bennett, South Pasadena, CA (US); Robert James Dixon, Jr., Chino Hills, CA (US)

(73) Assignee: Utility Trailer Manufacturing Company, City of Industry, CA (US)

( * ) Notice: Subject to any disclaimer, the term of this patent is extended or adjusted under 35 U.S.C. 154(b) by 0 days.

(21) Appl. No.: 15/230,268

(22) Filed: Aug. 5, 2016

(51) Int. Cl.
B62D 35/00 (2006.01)
B62D 37/02 (2006.01)

(52) U.S. Cl.
CPC ......... B62D 35/001 (2013.01); B62D 35/007 (2013.01); B62D 37/02 (2013.01)

(58) Field of Classification Search
CPC .. B62D 35/001; B62D 35/007; B62D 35/008; B62D 37/02
USPC ........................................... 296/180.1, 180.4
See application file for complete search history.

(56) References Cited

U.S. PATENT DOCUMENTS

| | | | | |
|---|---|---|---|---|
| 3,999,797 A * | 12/1976 | Kirsch | ................. | B62D 35/001 105/1.2 |
| 5,375,903 A | 12/1994 | Lechner | | |
| 7,862,102 B1 * | 1/2011 | Benton | ................. | B62D 35/001 296/180.1 |
| 8,360,507 B2 * | 1/2013 | Benton | ................. | B62D 35/001 296/180.1 |
| 8,684,447 B2 * | 4/2014 | Henderson | ........... | B62D 35/001 296/180.4 |
| 8,851,554 B2 | 10/2014 | Wayburn et al. | | |
| 9,457,847 B2 * | 10/2016 | Smith | .................. | B62D 35/001 |
| 2012/0025565 A1 * | 2/2012 | Nusbaum | ............. | B62D 35/001 296/180.4 |
| 2014/0339854 A1 * | 11/2014 | Tuerk | ................... | B62D 35/001 296/180.4 |
| 2015/0008701 A1 * | 1/2015 | Ryan | .................... | B62D 35/001 296/180.1 |
| 2015/0197292 A1 * | 7/2015 | Smith | .................. | B62D 35/007 296/180.4 |

OTHER PUBLICATIONS

STEMCO Truck TrailerTail® Fuel Savings Technology (4 pgs.).

* cited by examiner

Primary Examiner — Jason S Daniels
(74) Attorney, Agent, or Firm — Karish & Bjorgum, PC

(57) ABSTRACT

A rear fairing system for a vehicle includes a roof foil on top of the vehicle roof and sidewall foils pivotally mounted to the vehicle sidewalls. The roof foil includes downwardly facing concavity and a roof foil curved convex upper surface extending laterally across the vehicle roof. A spring extends laterally across the vehicle roof in the downwardly facing concavity. A door foil extends aft of the roof foil with a curved convex upper surface continuing the roof foil curved convex upper surface. Cables extend from the vehicle rear doors to the sidewall foils adjacent the sidewall foil free edges. The cables are taut and strain the sidewall foils toward the vehicle rear doors with the vehicle rear doors closed.

20 Claims, 4 Drawing Sheets

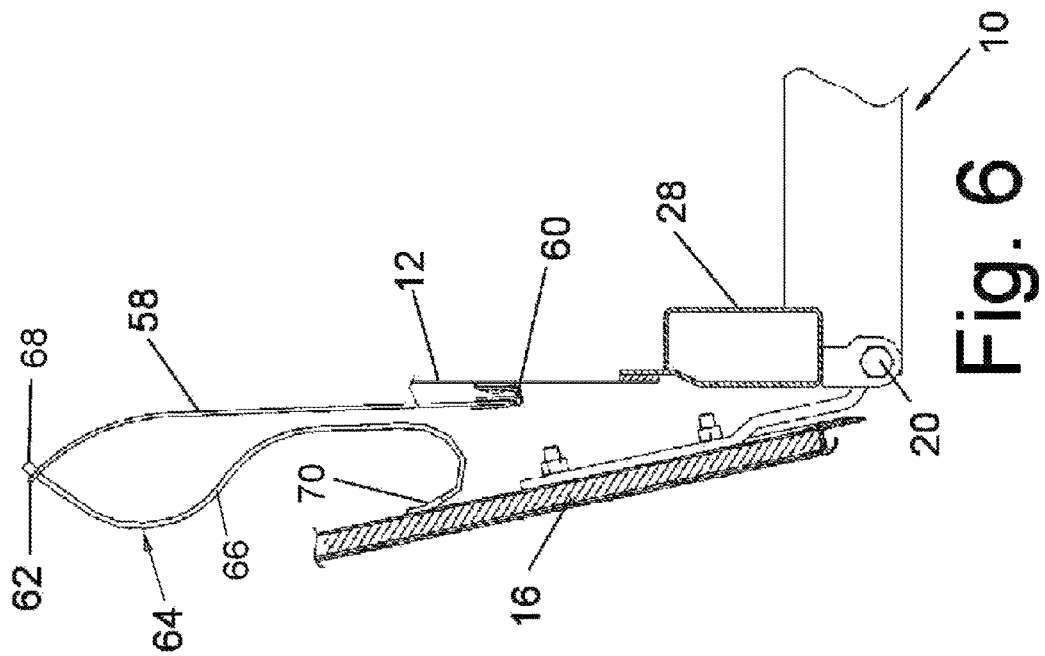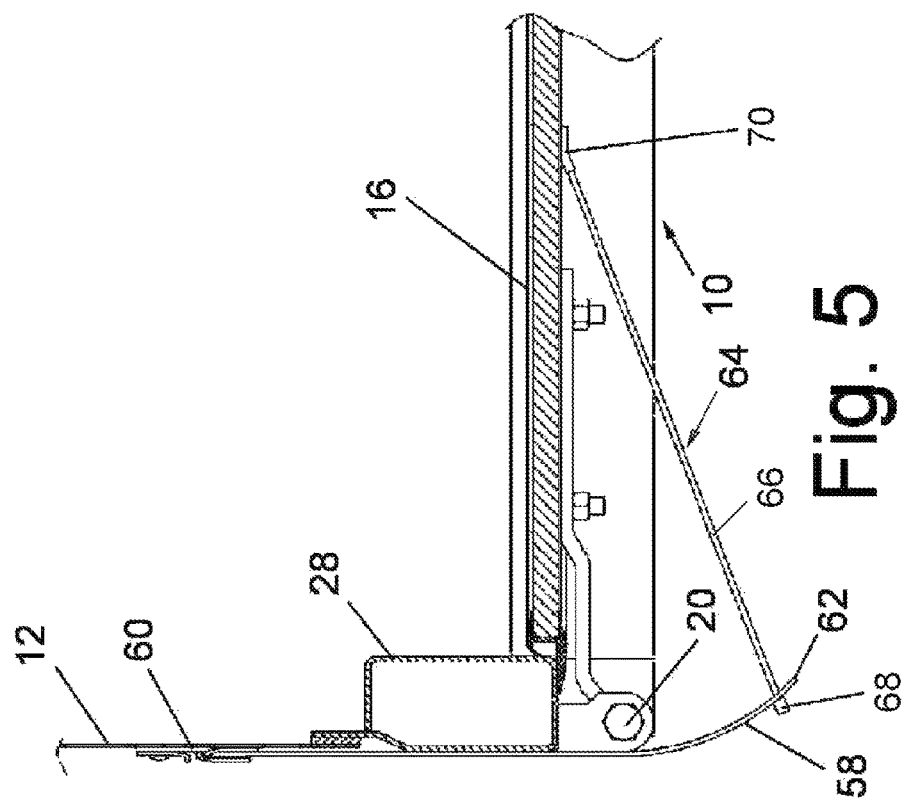

REAR FAIRING SYSTEM FOR A VEHICLE

BACKGROUND OF THE INVENTION

The field of the present invention is aerodynamic systems for vehicles.

Aerodynamic devices have long been employed on vehicles to enhance overall vehicle efficiency by reducing wind resistance, or drag. One such system applicable to cargo vehicles is illustrated in U.S. Pat. No. 8,191,956. Such devices are now commonly seen on truck cabs to smoothly divert impinging air around a semi-trailer truck. Side skirts of the type disclosed in the aforementioned patent are also now commonly seen on larger vehicles. Known, but less commonly employed, are such systems designed to address the reduced pressure behind a moving vehicle.

In spite of such devices having been commonly employed and encouraged by governmental mandate, the employment of such devices remains problematic. Of particular interest are rear fairings. It has been found that significant efficiency can be achieved by reasonably short fairings. Even so, such fairings are inconvenient in that they can be in the way when accessing loads through rear cargo doors and can be vulnerable to damage when backing to a dock or the like. Both side fairings and roof fairings at the rear of a vehicle can be subject to such issues.

SUMMARY OF THE INVENTION

The present invention is directed to rear fairings for conveyance vehicles having a rear opening door or doors.

In a first aspect of the present invention, a roof foil is employed on top of a vehicle. The foil has a downwardly facing concavity retaining a spring. The spring provides resilient vertical strain to reduce damage from impact and restore the foil to an original configuration. A door foil extends rearwardly and downwardly from an edge-abutting position with the roof foil. The door foil continues the foil curvature of the roof foil aft of the vehicle doors. With the raised roof foil and extending door foil, the doors can be opened and closed effectively without fairing interference. A fixed mounting for the foil may be displaced from the extending foil for added resilience.

In a second aspect of the present invention, sidewall foils are vertically hinged to the vehicle sidewalls forward of associated door hinges. Tension linkages extend from the vehicle doors to the sidewall foils adjacent the free edges of the foils. With the vehicle doors closed, the tension linkages are taut and strain the sidewall foils toward the vehicle rear doors. When opened, the tension linkages become slack and allow the sidewall foils to not interfere with the door opening. The forward location of the attachment to the vehicle can facilitate door opening and add foil resilience.

The foregoing arrangements and displaced mountings allow for the sidewall fairings and door fairings to be elastically deformable to a point that they will both provide proper fairing performance and compress against the vehicle without damage when the vehicle is backed into a solid surface. The curvature of these foils provides effective drag reduction without excessive extension aft of the vehicle.

Accordingly, it is an object of the present invention to provide an improved rear fairing system for improved vehicle efficiency. Other and further objects and advantages will appear hereinafter.

BRIEF DESCRIPTION OF THE DRAWINGS

FIG. 5 is a cross-sectional plan view of a sidewall foil.

FIG. 6 is a cross-sectional plan view of the sidewall foil of FIG. 5 with the vehicle rear door fully open.

DETAILED DESCRIPTION OF THE PREFERRED EMBODIMENT

Figure 1:
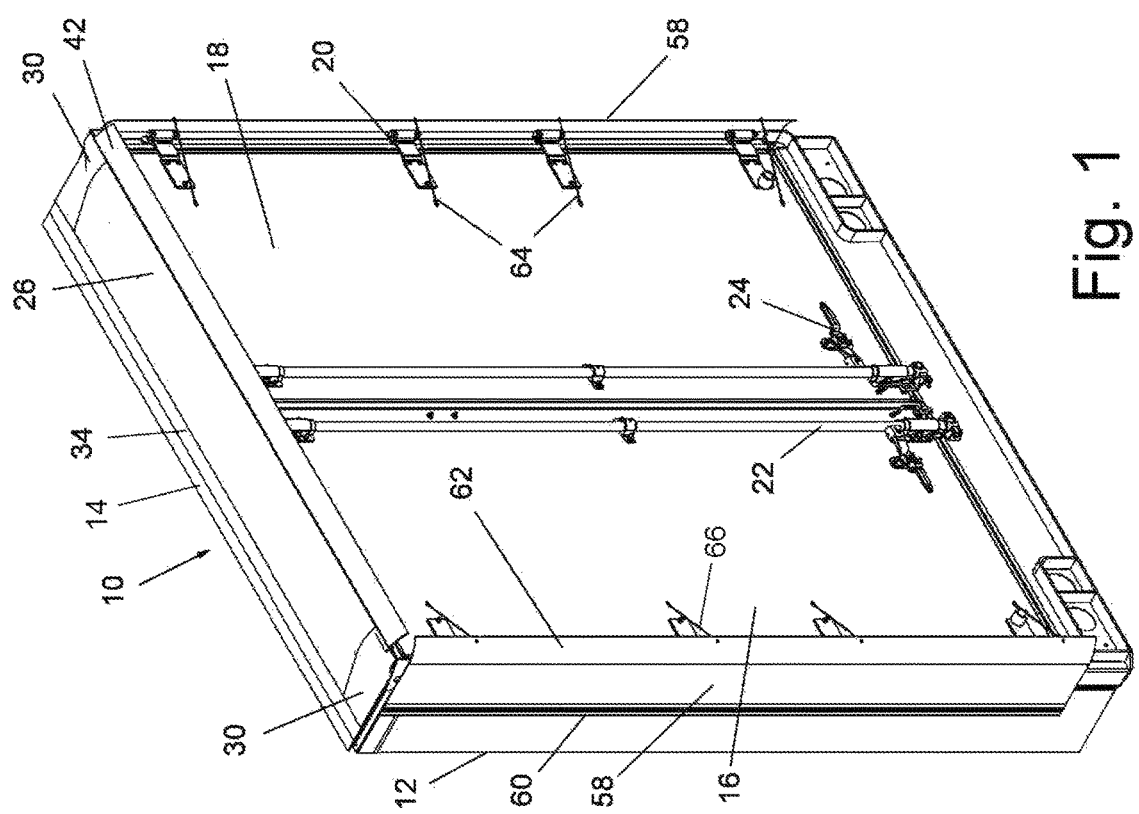
FIG. 1 is a perspective view of the back of a vehicle with a fairing system including sidewall foils and top foils.

Turning to the drawings in detail, FIG. 1 illustrates the back end of a conveyance vehicle which may be a truck, semi-trailer, trailer or other cargo vehicle 10. Such devices typically include vertical sidewalls 12, a horizontal roof 14 extending between the vertical sidewalls 12 and rear doors 16, 18. The rear doors 16, 18 are hinged about vertical pivot axes typically defined by a series of hinges 20 attached to the frame of the vehicle at the vehicle sidewalls 12. Typical latching mechanisms 22, 24 are also illustrated. A rear fairing system is illustrated to extend across the roof 14 and to extend down the vertical sidewalls 12.

Figure 2:
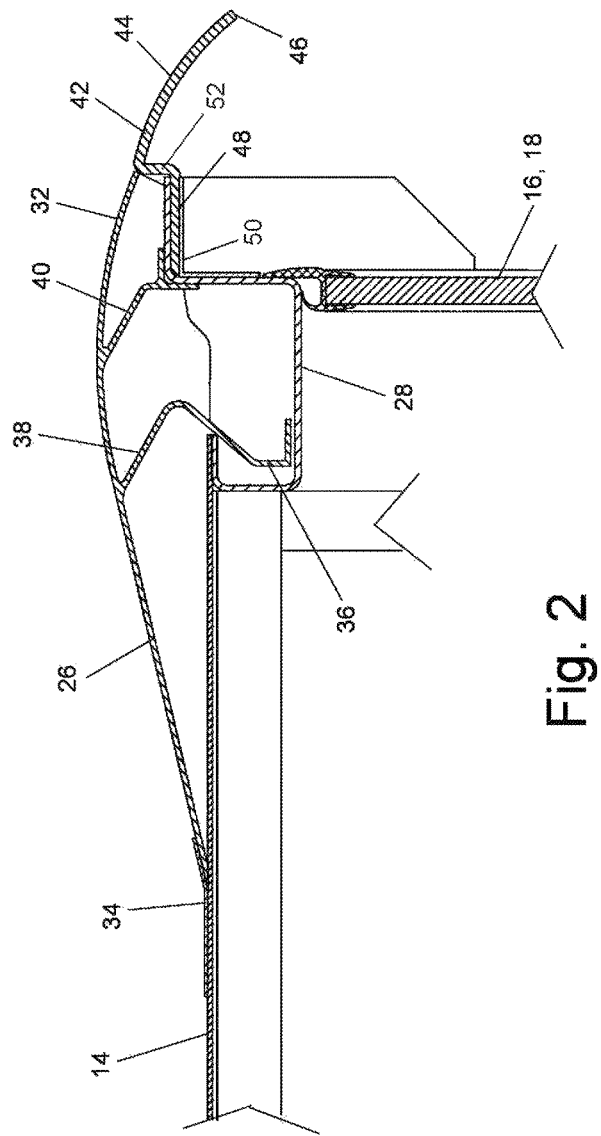
FIG. 2 is a cross-sectional side view of a first embodiment of a roof foil and door foil.
Figure 3:
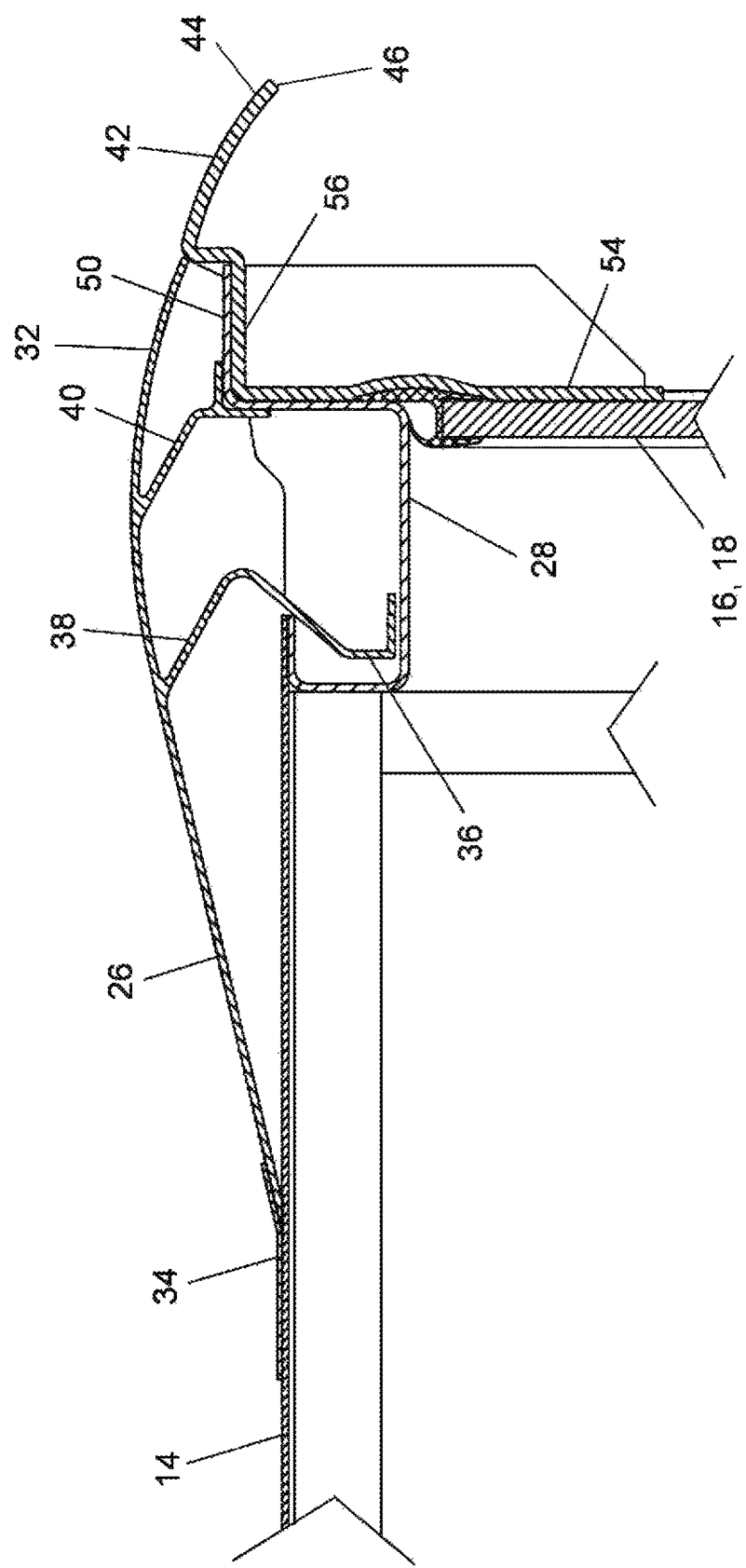
FIG. 3 is a cross-sectional side view of a second embodiment of a roof foil and door foil.

The fairing system includes a roof foil 26 on the vehicle roof 14. The roof foil 26 extends laterally across the roof 14 to the sidewalls 12. FIGS. 2 and 3 illustrate the same roof foil 26 in cross section. The roof foil 26 is associated with the top panel of the roof 14 and a horizontally extending vehicle frame 28 of the vehicle 10 which extends fully between the sidewalls 12. The roof foil 26, as well as the other foils discussed below, is principally a thermoplastic vulcanizate curved plate of fully cured EPDM rubber particles encapsulated in a polypropylene matrix. Such material exhibits flexibility and weather resistance.

The curvature of the plate defines a downwardly facing concavity on one side of the plate extending laterally across the vehicle. The ends of the plate are flattened by clamping strips 30 fastened to the vehicle frame adjacent the sidewalls 12. The top side of the curved plate defines a curved convex upper surface 32 extending laterally across the vehicle to the clamping strips 30. The roof foil 26 extends to a forward edge engaging the top of the roof 14 forward of the vehicle rear doors. The forward edge is sealed by tape 34. The arc defined by the roof foil 26 provides a transition for air flow over the trailing fairing assembly to create adequate door clearance for the fairing assembly. The clamping conveniently transitions roof airflow to avoid mixing with or disturbing the airflow along the sidewalls 12.

Figure 4:
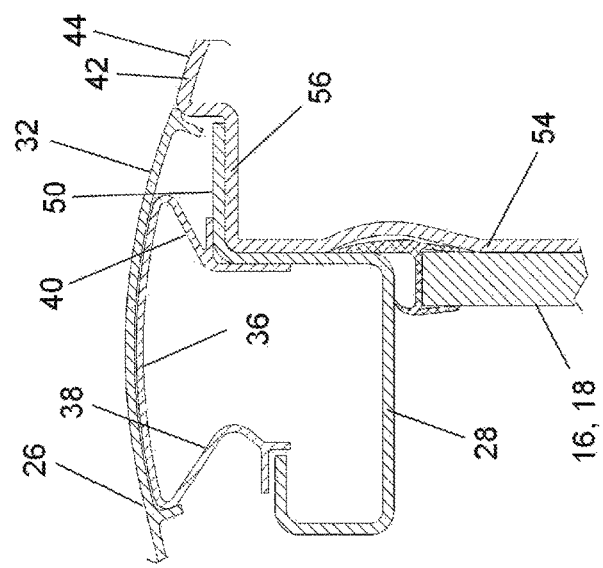
FIG. 4 is a cross-sectional detail side view of an alternative spring associate with the first embodiment.

As the roof foil 26 extends upwardly above the vehicle roof 14 and is subject to possible impact with dock structures, an elongate spring 36 extends laterally across the vehicle roof between the vehicle roof 14 and the roof foil 26 in the defined downwardly facing concavity. The roof foil 26 in the preferred embodiment is sufficiently resilient to compress against the roof 14 without exceeding the yield point of the plate as is the spring 36. The spring 36 is preferably integrally formed with the plate of the roof foil 26 as an extrusion of resilient material able to deform elastically under downward movement of the roof foil 26 from outside forces. The spring 36 provides vertical resilient strain by angled support walls 38, 40 which can flex without responding by experiencing column failure. The spring 36 is positioned against the vehicle frame 28. Through adaptive spring design, the plate of the roof foil 26 and the spring 36 can be separately formed as seen in FIG. 4.

A door foil 42 is shown in both FIGS. 2 and 3 to extend aft of the roof foil 26. The door foil 42 also extends laterally across the vehicle and has an edge-abutting relationship of a leading edge of the curved convex upper surface 44 with the trailing edge of the roof foil 26. The door foil 42 has the curved convex upper surface 44 extending from the roof foil 26 to a free edge 46 aft of the vehicle rear doors 16, 18. The surface 44 of the door foil 42 continues the curved convex upper surface of the roof foil 26 downwardly to the free edge 46 behind the back of the vehicle 10. A smooth continuous flow path therefore exists from the leading edge of the roof foil 26 to the free edge 46 of the door foil 42.

The mounting of the door foil 42 in FIGS. 2 and 3 illustrate a difference between embodiments. In FIG. 2, the door foil 42 is fixed to the vehicle frame 28 across the width of the vehicle 10. A mounting flange 48 extends from the door foil 42 below the vehicle frame 28. A spring steel angle bracket 50 extending across the vehicle 10 includes one leg fixed to the vehicle frame 28 by fasteners or the like and another leg fixed to the mounting flange 48 by bonding. The bracket 50 of spring steel is thin enough to resiliently deform if the door foil 42 is impacted. Further, there is a resilient plate section 52 between the door foil section and the mounting flange 48 which can also accommodate resilient bending under impact.

FIG. 3 illustrates an embodiment where the door foil 42 is fixed relative to the vehicle doors 16, 18 rather than to the vehicle 10 above the doors as shown in FIG. 2. With the door foil 42 fixed relative to the doors 16, 18, a break in the door foil is mandated to allow the doors 16, 18 to be opened. In this embodiment, a mounting flange 54 is bonded or otherwise affixed to the doors 16, 18.

A resilient plate section 56 between the door foil 42 and the area of juxtaposition of the mounting flange 54 with the vehicle doors 16, 18 is preferably not fixed to the vehicle doors 16, 18. Rather, the shape of this section 56 provides for its position laying against the doors 16, 18 when the doors 16, 18 are closed, placing the section 56 between the doors 16, 18 and the vehicle frame 28. Without the spring 50 of the other embodiment, the larger pate section 56 provides added impact resilience. When the doors 16, 18 are opened so far as to lie against the sidewalls 12, the door foil 42 clears the sidewall of the trailer.

In each of the embodiments of FIGS. 2 and 3, the door foil 42 is of an elastically deformable material as is the roof foil 26. With either of the mounting of the door foil 42, when the vehicle doors 16, 18 are closed, the door foil 42 is able to compress against the closed doors 16, 18 and avoid damage upon impact. When the vehicle doors 16, 18 are open, the door foil 42, when mounted to the vehicle 10 at the frame 28, can deform if the vehicle contacts the dock structure. With the door foil 42 mounted to the doors 16, 18 and they are open, the door foil 42 is out of any impact area.

The door foil curved convex upper surface 44 in either embodiment has a width approximating that of the vehicle 10. The extension length between the edge abutment and the door foil free edge 46 with downward curvature has been found to provide effective fairing efficiency without extending substantially beyond the vehicle. To put in the context of common semi-trailer trucks, the extension of the door foil 42 to the free edge is approximately five inches. The door foil 42 also curves inwardly of the vehicle by about two inches. This arrangement appears to enhance drag reduction with a minimum extension of the foil extension behind the vehicle.

A sidewall foil 58 is shown associated with each sidewall 12 of the vehicle 10. FIG. 5 illustrates one sidewall foil 58 arranged against one of the vehicle sidewalls 12. The sidewall foils 58 are mirror images of one another. A vertical hinge 60 is located at the forward end of each sidewall foil 58 to pivotally mount each of the foils 58 about a fairing pivot axis. The vertical hinges 60 of the preferred embodiment are shown to be living hinges. Mechanical hinges are also appropriately employed. A free edge 62 of each sidewall foil 58 is then located aft of the vehicle rear doors 16, 18.

The sidewall foils 58 are additionally attached to the vehicle 10 by tension linkages 64. The tension linkages 64 extend from the associated rear doors 16, 18 to the sidewall foils 58 at points adjacent to the free edges 62. The tension linkage 64 for each door 16, 18 is shown in the preferred embodiment to be four cables 66. The use of cables 66 is advantageous in that they are easily fabricated, reasonably indestructible and allow less critical placement of the anchor points on the rear doors 16, 18 than more mechanical linkages. The cables may be stiff enough to urge the sidewall foils 58 outwardly as the doors 16, 18 are opened yet have the ability to flex as seen in FIG. 6 for the doors 16, 18 to fully open. Other linkages are, of course, applicable. The number of elements forming each tension linkage 64 may vary depending on the makeup and flexibility of the associated sidewall foil 58 at its free edge 62. Brackets 68, 70 mount the ends of the cables 66.

With the vehicle doors 16, 18 open, any tension in the tension linkages 64 is released, allowing the sidewall foils 58 to pivot about the fairing pivot axes of the vertical hinges so as not to interfere with door opening. With the doors 16, 18 closed, the tension linkages 64 placed effectively at the free edges 62 strain the sidewall foils 58 into aerodynamically advantageous curved orientations as seen in FIG. 5. As with the door foil 42, the sidewall foils 58 are elastically deformable such that impact with a dock structure will not damage the sidewall foils 58.

In the preferred embodiment with the doors 16, 18 closed and the cables 66 taut, the extensions of the sidewall foils 58 to the free edges 62 are approximately five inches on semi-trailer trucks. The sidewall foils 62 also curve inwardly of the vehicle by about two inches. This arrangement again appears to enhance drag reduction with a minimum extension of the foil extension behind the vehicle.

Additional cable length is accommodated by placement of the brackets 70 on the doors 16, 18 further from the vertical pivot axis. FIG. 6 illustrates a sidewall foil 58 with the vehicle rear door 16 fully open.

Thus, an improved fairing system has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A rear fairing for a vehicle having a vehicle frame, a vehicle roof on the vehicle frame and vehicle rear doors hinged to the vehicle about vertical pivot axes, comprising
a roof foil on top of and extending laterally across the vehicle roof, the roof foil including a forward edge engaging the vehicle roof forward of the vehicle rear doors, a downwardly facing concavity extending laterally across the vehicle aft of the forward edge and a roof foil curved convex upper surface extending laterally across the vehicle;
a spring extending laterally across the vehicle between the vehicle and the roof foil in the downwardly facing concavity, the laterally extending spring providing vertical resilient strain between the roof foil and the vehicle;

a door foil extending aft of the roof foil with the vehicle rear doors closed and including a door foil free edge aft of the vehicle rear doors, a door foil curved convex upper surface, and a leading edge of the door foil curved convex upper surface, the leading edge abutting the roof foil with the vehicle rear doors closed, the door foil curved convex upper surface extending downwardly from the leading edge to the door foil free edge, the door foil free edge being above the vehicle roof, the door foil further including a curved foil section defining the door foil curved convex upper surface and extending from the leading edge to the door foil free edge, a mounting flange section fixed to the vehicle doors and a resilient plate section between the curved foil section and the mounting flange section.

2. The rear fairing of claim 1, wherein the door foil is fixed to the vehicle doors and including a break between the vehicle doors.

3. The rear fairing of claim 1, wherein the door foil is elastically deformable to against the vehicle at the door foil free edge.

4. The rear fairing of claim 1, wherein the door foil curved convex upper surface has a width approximating the width of the vehicle and an extension length between the edge-abutment and the door foil free edge, the door foil curved convex upper surface extending aft of the vehicle rear doors by about five inches and inwardly of the vehicle by about two inches.

5. The rear fairing of claim 1, wherein the spring is integrally extruded with the roof foil.

6. The rear fairing of claim 1, the vehicle further having vehicle sidewalls, the rear fairing further comprising
sidewall foils;
vertical hinges mounted to the vehicle sidewalls, respectively, forward on the vehicle from the vertical pivot axes and defining fairing pivot axes, the sidewall foils being pivotally mounted to the vehicle sidewalls, respectively, only by the vertical hinges and including sidewall foil free edges aft of the vehicle rear doors;
tension linkages extending from the vehicle rear doors to the sidewall foils adjacent the sidewall foil free edges, the tension linkages being taut and straining the sidewall foils toward the vehicle rear doors with the vehicle rear doors closed.

7. The rear fairing of claim 6, the tension linkages each including multiple cables.

8. The rear fairing of claim 6, wherein the sidewall foils each has an extension length aft of the vehicle rear doors of about five inches and an extension inwardly of the vehicle of about two inches.

9. A rear fairing for a vehicle having a vehicle frame, a vehicle roof on the vehicle frame and vehicle rear doors hinged to the vehicle about vertical pivot axes, comprising
a roof foil on top of and extending laterally across the vehicle roof, the roof foil including a forward edge engaging the vehicle roof forward of the vehicle rear doors, a downwardly facing concavity extending laterally across the vehicle aft of the forward edge and a roof foil curved convex upper surface extending laterally across the vehicle;
a spring extending laterally across the vehicle between the vehicle and the roof foil in the downwardly facing concavity, the laterally extending spring providing vertical resilient strain between the roof foil and the vehicle;

a door foil extending aft of the roof foil with the vehicle rear doors closed and including a door foil free edge aft of the vehicle rear doors, a door foil curved convex upper surface and a leading edge of the door foil curved convex upper surface, the leading edge abutting the roof foil, the door foil curved convex upper surface extending downwardly from the leading edge to the door foil free edge, the door foil being on the vehicle fixed relative to the vehicle frame.

10. The rear fairing of claim 9, wherein the door foil free edge is above the vehicle doors.

11. The rear fairing of claim 9, wherein a spring angle bracket has a first leg fixed to the vehicle above the doors and a second leg fixed to the door foil.

12. The rear fairing of claim 11, the door foil further including a curved foil section defining the door foil curved convex upper surface and extending from edge-abutting the roof foil to the door foil free edge, a mounting flange section fixed to the second leg and a resilient plate section between the curved foil section and the mounting flange section.

13. The rear fairing of claim 9, wherein the door foil is elastically deformable to against the vehicle at the door foil free edge.

14. The rear fairing of claim 9, wherein the door foil curved convex upper surface has a width approximating the width of the vehicle and an extension length between the leading edge and the door foil free edge, the door foil curved convex upper surface extending aft of the vehicle rear doors by about five inches and inwardly of the vehicle by about two inches.

15. The rear fairing of claim 9, wherein the spring is integrally extruded with the roof foil.

16. The rear fairing of claim 9, the vehicle further having vehicle sidewalls, the rear fairing further comprising
sidewall foils;
vertical hinges mounted to the vehicle sidewalls, respectively, forward on the vehicle from the vertical pivot axes and defining fairing pivot axes, the sidewall foils being pivotally mounted to the vehicle sidewalls, respectively, only by the vertical hinges and including sidewall foil free edges aft of the vehicle rear doors;
tension linkages extending from the vehicle rear doors to the sidewall foils adjacent the sidewall foil free edges, the tension linkages being taut and straining the sidewall foils toward the vehicle rear doors with the vehicle rear doors closed.

17. The rear fairing of claim 16, the tension linkages each including multiple cables.

18. The rear fairing of claim 16, the sidewall foils each including an extension length aft of the vehicle rear doors of about five inches and an extension inwardly of the vehicle of about two inches.

19. A rear fairing for a vehicle having a vehicle frame, a vehicle roof on the vehicle frame and vehicle rear doors hinged to the vehicle about vertical pivot axes, comprising
a roof foil on top of and extending laterally across the vehicle roof, the roof foil including a forward edge engaging the vehicle roof forward of the vehicle rear doors, a downwardly facing concavity extending laterally across the vehicle aft of the forward edge and a roof foil curved convex upper surface extending laterally across the vehicle;
a door foil extending aft of the roof foil with the vehicle rear doors closed and including a door foil free edge aft of the vehicle rear doors, a door foil curved convex upper surface, and a leading edge of the door foil curved convex upper surface, the leading edge abutting the roof foil with the vehicle rear doors closed, the door foil curved convex upper surface extending downwardly from the leading edge to the door foil free edge, the door foil free edge being above the vehicle roof, the door foil further including a curved foil section defining the door foil curved convex upper surface and extending from the leading edge to the door foil free edge, a mounting flange section fixed to the vehicle doors and a resilient plate section between the curved foil section and the mounting flange section.

20. A rear fairing for a vehicle having a vehicle frame, a vehicle roof on the vehicle frame and vehicle rear doors hinged to the vehicle about vertical pivot axes, comprising
- a roof foil on top of and extending laterally across the vehicle roof, the roof foil including a forward edge engaging the vehicle roof forward of the vehicle rear doors, a downwardly facing concavity extending laterally across the vehicle aft of the forward edge and a roof foil curved convex upper surface extending laterally across the vehicle;
- a door foil extending aft of the roof foil with the vehicle rear doors closed and including a door foil free edge aft of the vehicle rear doors, a door foil curved convex upper surface, and a leading edge of the door foil curved convex upper surface, the leading edge abutting the roof foil, the door foil curved convex upper surface extending downwardly from the leading edge to the door foil free edge, the door foil being on the vehicle fixed relative to the vehicle frame.

\* \* \* \* \*